United States Patent [19]

Kawakami et al.

[11] 4,116,101
[45] Sep. 26, 1978

[54] AUTOMATIC FRET SAWING MACHINES

[75] Inventors: Hideo Kawakami, Numazu; Hitoshi Ebata, Mishima, both of Japan

[73] Assignee: Toshiba Kikai Kabushiki Kaisha, Tokyo, Japan

[21] Appl. No.: 808,880

[22] Filed: Jun. 22, 1977

[30] Foreign Application Priority Data

Jun. 24, 1976 [JP] Japan .................................. 51-73829

[51] Int. Cl.² ............................................. B27B 19/02
[52] U.S. Cl. ........................................ 83/747; 83/784; 83/427
[58] Field of Search .................. 83/784, 747, 789, 768, 83/783, 820, 427

[56] References Cited

U.S. PATENT DOCUMENTS

| 156,417 | 11/1874 | Fenner | 83/784 |
| 229,908 | 7/1880 | Numan | 83/747 |
| 3,548,697 | 12/1970 | Gerber et al. | 83/427 |
| 3,908,723 | 9/1975 | Hill | 83/747 |

Primary Examiner—Donald R. Schran
Attorney, Agent, or Firm—Koda and Androlia

[57] ABSTRACT

In an automatic sawing machine wherein a workpiece is moved in two orthogonal directions by a profile control or a numerical control so as to cut a groove of a predetermined profile, the opposite ends of the fret saw blade are synchronously driven by independent pulse motors so as to direct the fret saw blade always in the tangential direction of the profile.

1 Claim, 2 Drawing Figures ized in the fret sawing machine shown in FIG. 1.

AUTOMATIC FRET SAWING MACHINES

BACKGROUND OF THE INVENTION

This invention relates to an automatic fret sawing machine and more particularly to an improved fret saw blade rotating device.

An automatic fret sawing machine has been used to cut a groove of a predetermined profile by a fret saw blade reciprocated in the vertical direction while moving a workpiece in the directions of orthogonal X and Y axes on a plane. To this end, it is necessary to conrol the fret saw blade to direct it always in the tangentional direction with respect to the profile, and the upper and lower ends of the fret saw blade are held by clamping means secured to the ends of the upper and lower driving shafts respectively which are disposed to reciprocate in the vertical direction. Since the fret saw blade is thin and delicate it is necessary to synchronously rotate the upper and lower drive shafts for rotating the saw blade about its longitudinal axis.

In a prior art driving mechanism the upper and lower drive shafts are rotated by a common drive source such as an electric motor or a hydraulic motor through various motion transmission means so that the mechanism is not only complicated and expensive but also requires troublesome maintenance. Moreover, as spaced upper and lower drive shafts are driven by a single drive source, the weight and moment of inertia of the motion transmission means are large thus making it difficult to provide a fine and accurate control. Moreover, as it is necessary to use a drive source of large power and a large number of component parts for the motion transmission means gaps between component parts make it difficult to attain accurate control.

SUMMARY OF THE INVENTION

It is an object of this invention to provide an automatic fret sawing machine provided with an improved driving device for rotating the fret saw blade and capable of accurately controlling the fret saw blade with a simple and small drive source.

Another object of this invention is to provide an improved driving mechanism for an automatic fret sawing machine which can eliminate inaccurate working due to gaps between the component parts of the driving mechanism and the moment of inertia thereof.

According to this invention, there is provided an automatic fret sawing machine adapted to cut a groove of a predetermined profile through a workpiece wherein the workpiece is moved in two orthogonal directions in a plane by a profile control or a numerical control while a fret saw blade is continuously reciprocated in a direction perpendicular to the plane, there are provided a pair of drive shafts respectively connected to the opposite ends of the fret saw blade, a pair of drive motors respectively connected to the drive shafts for driving the same, and means for synchronously energizing the drive motors so as to direct the fret saw blade always in a direction tangential to the profile to be worked.

DESCRIPTION OF THE PREFERRED EMBODIMENT

Figure 1:
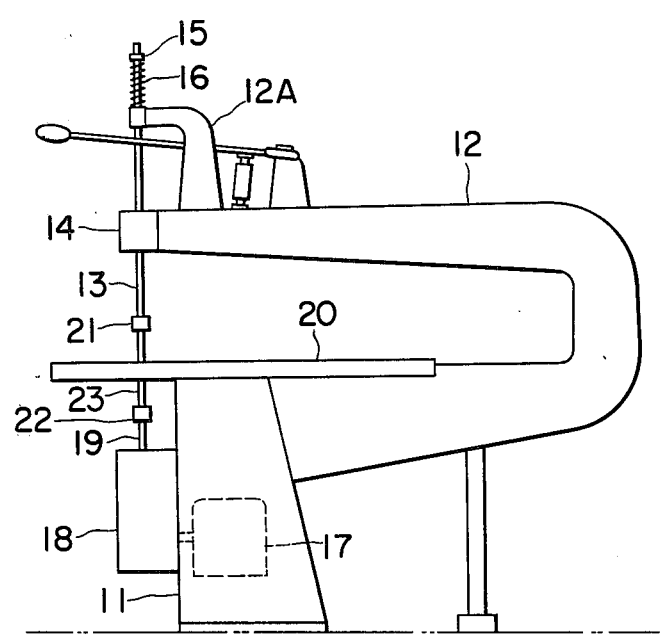
FIG. 1 is a side view of an automatic fret sawing machine embodying the invention.

A preferred embodiment of this invention illustrated in FIG. 1 comprises a vertical pedestal 11 installed on the floor for supporting a U shaped frame 12, and a box 14 for journalling a upper drive shaft 13 and secured to one end of the upper arm of the supporting frame 12. The shaft 13 extends upwardly through the box 14 and is normally urged upwardly by a coil spring 16 interposed between a flange 15 secured to the upper end of the drive shaft and a bracket 12A secured to the upper arm of the supporting frame 12.

An electric motor 17 is housed in the pedestal 11 for reciprocating a lower drive shaft 19 in the vertical direction through a crank mechanism 18. A table 20 for supporting a workpiece, not shown, is secured to the upper end of the pedestal 11. Clamping members 21 and 22 are secured to the inner ends of the upper and lower drive shafts 13 and 19, respectively, for clamping the opposite ends of a fret saw blade 23. Accordingly, the fret saw blade 23 is reciprocated in the vertical direction by motor 17 through the crank mechanism and rotated about the longitudinal axis of the blade by a rotating mechanism to be described below.

Figure 2:
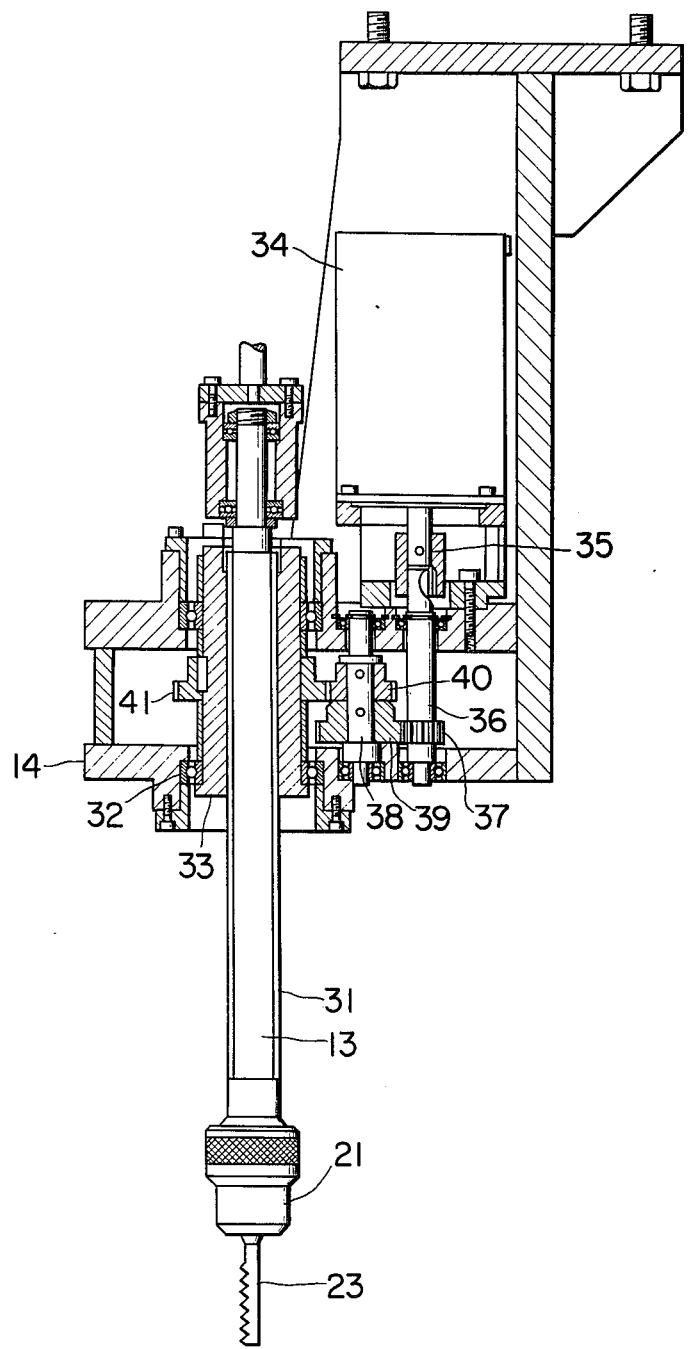
FIG. 2 is a longitudinal sectional view showing the upper drive shaft and its driving motor which are utilized in the fret sawing machine shown in FIG. 1.

The detail of the rotating mechanism for the fret saw blade 23 is shown in FIG. 2 in which the upper drive shaft 13 is shown in its lowermost position. Since the rotating mechanism for the lower drive shaft 19 is identical to that shown in FIG. 2 only the rotating mechanism for the upper shaft will be described in detail. Splines 31 are formed on the lower portion of the upper drive shaft 13.

There is provided a bushing 33 which mate the splines 31 and is rotatably supported by bearings 32 so that the upper drive shaft 13 can slide freely in the vertical direction but is prevented from rotating by the bushing 33. The clamping member 21 is secured to the lower end of the shaft 31 to clamp the upper end of the fret saw blade.

A pulse motor 34 is mounted on the box 14 with its output shaft connected to a first shaft 36 through a coupling 35. A gear 37 secured to shaft 36 meshes a gear 39 secured to a second shaft 38, and a gear 40 secured to shaft 38 meshes a gear 41 secured to the bushing 41.

When the pulse motor 34 is energized, the fret saw blade 23 is rotated about its longitudinal axis in a direction determined by a pulse motor driving device, not shown, by an angle determined by the number of pulses. Since the driving mechanism for the lower drive shaft 23 has the same construction, by driving the upper and lower pulse motors from the same pulse motor driving device the upper and lower drive shafts are rotated synchronously.

In the operation of a fret sawing machine to cut a groove of a predetermined profile through a workpiece, as is well known in the art, the workpiece, now shown, is mounted on the table 20 and moved in the X and Y directions of a rectangular coordinate by a profile control or a numerical control. While the saw blade is continuously reciprocated in the vertical direction by electric motor 17, the energization and the number of pulses applied to the upper and lower pulse motors are synchronously controlled in accordance with a program corresponding to the profile so that the saw blade is always directed in the tangential direction to the predetermined profile.

When compared with the prior art constructions in which the upper and lower shafts are driven by a common drive source through motion transmission devices, according to this invention since the distance between each drive source and each drive shaft is reduced greatly, and since the motion transmission device therebetween is simplified not only the mechanism is simplified but also the moment of inertia of the driving system is reduced thus enabling fine and accurate control. Moreover, the capacity of the drive source can be reduced and control error due to gaps between the component parts of the driving system can be reduced.

What is claimed is:

1. In an automatic fret sawing machine adapted to cut a groove of a predetermined profile through a workpiece wherein the workpiece is moved in two orthogonal directions in a plane by a profile control or a numerical control while a fret saw blade is continuously reciprocated in a direction perpendicular to said plane, the improvement which comprises a pair of drive shafts respectively provided with spline portions, mating bushings and connected to opposite ends of said fret saw blade, a pair of pulse motors which are controlled to move in a direction and by an amount designated by said profile control or numerical control, said pulse motors being respectively connected to said drive shafts through said bushings and reduction gear trains for driving said drive shafts, means for synchronously energizing said pulse motors so as to direct said saw blade always in a direction tangential to said profile to be worked, and a clamping member secured to said drive shaft and adapted to clamp one end of the fret saw blade.

* * * * *